US012386747B2

(12) United States Patent
Fang et al.

(10) Patent No.: US 12,386,747 B2
(45) Date of Patent: Aug. 12, 2025

(54) METHOD FOR FEDERATED-LEARNING-BASED MOBILE EDGE CACHE OPTIMIZATION

(71) Applicant: Beijing University of Technology, Beijing (CN)

(72) Inventors: Juan Fang, Beijing (CN); Ziyi Teng, Beijing (CN); Huijing Yang, Beijing (CN); Shuaibing Lu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/702,683

(22) PCT Filed: May 13, 2022

(86) PCT No.: PCT/CN2022/092686
§ 371 (c)(1),
(2) Date: Apr. 18, 2024

(87) PCT Pub. No.: WO2023/168824
PCT Pub. Date: Sep. 14, 2023

(65) Prior Publication Data
US 2024/0427700 A1    Dec. 26, 2024

(30) Foreign Application Priority Data
Mar. 7, 2022 (CN) .......................... 202210216109.3

(51) Int. Cl.
G06F 12/08 (2016.01)
G06F 12/0802 (2016.01)

(52) U.S. Cl.
CPC .............. *G06F 12/0802* (2013.01)

(58) Field of Classification Search
CPC ..... G06F 12/0802; G06F 30/27; H04L 67/568
See application file for complete search history.

(56) References Cited

U.S. PATENT DOCUMENTS

2009/0271574 A1 * 10/2009 Larkby-Lahet ....... G06F 12/122
711/E12.069

FOREIGN PATENT DOCUMENTS

| AU | 2020103384 | 1/2021 |
|---|---|---|
| CN | 104602255 | 5/2015 |
| CN | 111860595 | 10/2020 |
| CN | 113315978 | 8/2021 |
| CN | 113364543 | 9/2021 |

* cited by examiner

*Primary Examiner* — Jae U Yu
(74) *Attorney, Agent, or Firm* — Leonid Kisselev

(57) ABSTRACT

The invention relates to an optimization method for mobile edge cache based on federated learning. The situation that the user mobility and the content popularity change continuously in the range of a single base station is considered, and the cache hit rate is increased by predicting the content popularity and placing the request content in an edge cache in advance. The method includes obtaining a user moment trajectory table to simulate a moving path of a user by using an RWP random path point model, selecting the user participating in FL local training in a clustering, and threshold value combination mode in consideration of local training consumption, performing global model aggregation by using an attention mechanism to control model weight, and performing global prediction according to an obtained global prediction model. The predicted request content is cached to the server in advance.

4 Claims, 5 Drawing Sheets

METHOD FOR FEDERATED-LEARNING-BASED MOBILE EDGE CACHE OPTIMIZATION

CROSS-REFERENCE TO RELATED APPLICATIONS

This patent application is the U.S. National Phase patent application under 35 U.S.C. § 371, which claims priority to International Application No. PCT/CN2022/092686, filed on May 13, 2022, which claims the benefit of priority to Chinese Patent Application No. 202210216109.3, filed on Mar. 7, 2022, the disclosures of which are incorporated by reference herein.

FIELD

The invention belongs to the fields of Internet of things and artificial intelligence, and in particular relates to an optimization method for mobile edge cache based on federated learning.

BACKGROUND

With the development of the Internet of Things and communication technologies, the number of next-generation Internet of Things devices is growing explosively, and users have higher and higher requirements for content delays. Obtaining content from remote data centers may not be able to meet users' low-latency requirements. Mobile edge computing (MEC) introduces computing and caching services from the mobile network operator (MNO) or cloud to the edge of the network e.g. base stations (BSs), and content can be cached at the edge to meet user experience (Quality of Experience, QoE). Therefore, the research on edge caching has become one of the hottest research topics in the field of wireless communication. Due to the limited storage space of edge nodes, the caching solution needs to identify and cache popular content that most users are interested in. Based on content popularity, caching popular content on the edge cloud can reduce network link congestion and request delay, thereby improving user QoE.

Traditional intelligent algorithms for predicting content popularity need to send user data to a central server for training. While the transmission of a large amount of unprocessed data puts pressure on the network, user privacy is also threatened. In 2016, Google proposed Federated Learning (FL), a mobile edge computing framework for Machine Learning (ML) technology, which uses distributed client data and computing resources to train high-performance ML models, while protecting client data privacy. In federated learning, the data on the terminal device is non-independent and identically distributed, which is suitable for the independence of the terminal device in the MEC environment and is easy to expand.

Using federated learning to design an edge caching method can predict content popularity and cache popular content while protecting client data privacy, so as to reduce network link congestion and request delay. For example, Yu et al. proposed a federated learning-based active content caching (FPCC) method, based on a layered architecture, each user uses a hybrid filtering method on stacked autoencoders to train local data, and predicts content popularity based on local data, secondly, the server averagely aggregates the model parameters of the client to build a global model, and selects the most popular files for edge caching; Jiang et al. proposed a new context-aware popularity prediction strategy based on federated learning, which learns and utilizes contextual information by considering user preferences clustering, to formulate an effective global popularity prediction model based on local model learning; Gao et al. proposed a caching strategy that considers mobility and content caching popularity by means of federated learning, and by considering the concept of one-stop service (OSS), predict the density of pedestrians within the range of each base station, and use the prediction results to calculate the request probability for a single file, establish a minimization model by establishing the minimum routing cost and file request probability, and use the greedy algorithm to select content collections to cache under the minimum routing cost; Yu et al. propose a federated learning-based mobile-aware active edge caching scheme (MPCF) employing context-aware adversarial autoencoders to predict highly dynamic content popularity. Although the above schemes use different methods to predict content popularity, there are still some problems in the MEC environment, even within the range of small base stations, due to the high density and mobility of terminal devices: (1) within the range of base stations all users participate in training, resulting in unnecessary consumption of terminal equipment; (2) due to the different computing power and data quality of terminal equipment, the quality of the obtained local model is uneven, and the global model obtained by simple average aggregation will slow down the convergence speed of the global model.

In order to deal with the above problems, the object of the present invention is to propose an optimization method for mobile edge cache based on federated learning, by optimizing user selection and model aggregation in federated learning to reduce the consumption of local users as well as accelerates the convergence of the global model and improves the cache hit rate.

SUMMARY

Aiming at predicting content popularity, cache placement is performed to improve the cache hit rate. In MEC environment, the user data privacy security and data transmission caused by the centralized training of all user data caused network load problems. The invention adopts a federated learning approach, that is, by placing the same predictive model on the user and MEC server, using user data to train the local model, and the server-side aggregates the parameters of the local model to obtain a global model to predict the popularity of the content. The present invention proposes a user selection and aggregation method in the process of federated learning to reduce the problem of unnecessary consumption of terminal equipment caused by all users participating in training within the same base station, and at the same time improve the cache hit rate to reduce user request latency.

In order to solve the above problems, the present invention proposes an optimization method for mobile edge cache based on federated learning. Considering user mobility, the federated learning training content popularity prediction model is used to select users participating in federated learning training and optimize global model aggregation. In order to reduce the consumption of terminal equipment, predict the popularity of content and perform active edge caching to achieve the purpose of improving the cache hit rate and reducing the delay of user requests. To achieve this goal, first of all, it is necessary to establish a user's mobile model and determine the user's mobile range; secondly, in the federated training, the similarity of request content between users is used, and the DBSCAN (Density Based Spatial Clustering of Applications with Noise) clustering algorithm is used. A threshold is introduced to select a certain proportion of users from the cluster to participate in training, and then the attention mechanism is used to control the model aggregation weight to balance the uneven contribution of the user's local model quality to the global model. The model is trained in a distributed manner, and the global model of users within the base station is obtained through weight aggregation. According to the obtained global prediction model, the predicted request content is proactively cached in advance to speed up the convergence of global model while reducing local consumption, improve the cache hit rate.

The specific technical scheme is as follows:

An optimization method for mobile edge cache based on federated learning, considering the changing situation of user mobility and content popularity within a single base station, and improves the cache hit rate by predicting content popularity and placing it in edge cache in advance. The federated learning FL method is used to predict content popularity. The same prediction model is deployed on each user and MEC server. The local prediction model is based on the user's historical request data, and the global model is obtained by server aggregation of user model parameters. It is characterized in that, using the RWP random waypoint model to obtain the user's time trajectory table to simulate the user's movement path, considering the local training consumption, select the users participating in the FL local training by combining clustering and threshold, and use the attention mechanism to control the model weight to carry out global model aggregation, and cache the predicted request content to the server in advance according to the obtained global prediction model to improve the cache hit rate, mainly including the following steps:

Step 1: Use the RWP random waypoint model to obtain the trajectory table of user time, and obtain the user set within the coverage area of the base station in each time slice. The method for obtaining the user set $U^t$ within the coverage area of the base station at time slice t is as follows:

Using the concept of time slots to divide the considered time period into T segments, expressed as $\Gamma=\{1, 2, \ldots, t, \ldots, T\}$, the position of the user $u_i$ generated by the RWP model in time slice t, calculate the distance between the user $u_i$ and the base station, if the distance is less than the coverage of the base station, then the user is the user within the coverage of the base station at time t, traverse all users to obtain the user set $U^t$ within the coverage of the base station at time slice t.

Step 2: According to the user set $U^t$ obtained in step 1, further select users who participate in FL local training, the selection method is as follows:

Step 2.1: Calculate the preferences of all users in the user set $U^t$ who moved to the base station at the current time t, where the preference $P_{u_i}$ of the $i^{th}$ user $u_i$ is equal to the point multiplication of model parameters $w_{u_i}^{t-1}$ of the user $u_i$ at t−1 and the user's historical request data $D_i^{t-1}$ at t−1; send the preferences to the MEC server, and calculate the cosine similarity of preferences between any user in the user set, where the specific formula for the cosine similarity of preferences between user $u_i$ and user $u_j$ is:

$$Sim_{u_j}^{u_i} = \frac{P_{u_i}^t \cdot P_{u_j}^t}{\|P_{u_i}^t\| \|P_{u_j}^t\|} \quad (2)$$

Using the cosine similarity of user preferences as input of the DBSCAN clustering algorithm to cluster users.

Step 2.2: Set the clustering result as category a, and label is $\{1, 2, \ldots, a-1, \text{None}\}$, where label None indicates a low similarity with other users due to the uncertainty of the user's movement location and request content. The number of users in each category of the cluster with 1 user is $\{N_1, N_2, \ldots, N_a, N_{none}\}$, where $N_i$ represents the number of users in one category, and the sum of the number of users with labels other than None is $N_{sel}$, that is $N_{sel}=\sum_{i=1}^{a-1} N_i$, the proportion of each type of user participating in the training is selected according to the thresholds $T_{max}$ and $T_{min}$, which can be expressed as follows:

$$\begin{cases} \frac{N_{none}}{N_{none} + N_{sel}} < T_{min}, N_{pro} = p, N_{sel} = 1 - p \\ T_{min} < \frac{N_{none}}{N_{none} + N_{sel}} < T_{max}, N_{pro} = 0.5, N_{sel} = 0.5 \\ \frac{N_{none}}{N_{none} + N_{sel}} > T_{max}, N_{pro} = q, N_{sel} = 1 - q \end{cases} \quad (3)$$

Wherein, $$\frac{N_{none}}{N_{none} + N_{sel}}$$

indicates the ratio of the number of users in None category to all categories of users. $N_{pro}$ represents the selection ratio of None category, that is, $N_{none}*N_{pro}$ users are randomly selected from None category to participate in training. $N_{sel}$ is the selection ratio of non-None categories. $N_i*N_{sel}$ users are selected from one category, where i=$\{1, 2, \ldots, a-1\}$, p and q are random values within the range of (0.2, 0.5); the set of users selected in each category is user set Ct that segment t participates in model training, where $C_t \in U^t$.

Step 3: Train the FL local model in a distributed manner to the users selected in Step 2, aggregate by controlling the aggregation weight to obtain the global model, and cache the predicted popular content to the server according to the obtained global model. The specific process is as follows:

Step 3.1: MEC server sends the FL global model parameter $w^{t-1}$ obtained at time t−1 to all users in the user set $C_t$ participating in model training at segment t as the initial parameter of the user model at segment t; user $u_i$ uses the local history data $D_i^t$ training model corresponding to segment t to obtain the updated user model parameter $w_{u_i}^t$. The average loss value is $\overline{\mathcal{L}_{u_i}^t}$ the number of batches required to complete an epoch is $B\_num_{u_i}^t$. For segment t, the ratio of user $u_i$ training model data to all user data participating in training is $$o_{u_i}^t = \frac{H_i^t}{\sum_{i \in C_t} H_i^t}.$$

Step 3.2: The users participating in the training upload the obtained proportion $o_{u_i}^t$, model parameters $w_{u_i}^t$, average loss $\overline{\mathcal{L}_{u_i}^t}$ and B_num$_{u_i}^t$ to the server for aggregation. The user's aggregation weight is obtained according to the attention mechanism, that is $$p_u^t = \text{Attention}(Q^t, K_U^t) = \text{softmax}\left(\frac{Q^t K_U^t}{\sqrt{d_k}}\right),$$

where $p_u^t$ is the user aggregation weight vector, $K_U^t$= [$\overline{\mathcal{L}_{u_i}^t}$, $o_u^t$, B_num$_u^t$], $\overline{\mathcal{L}_{u_i}^t}$, $o_u^t$ and B_num$_u^t$ are respectively the vectors of $\overline{\mathcal{L}_{u_i}^t}$, $o_u^t$ and B_num$_u^t$ composed by all users in the user set $C_t$, $Q^t$=[min($\overline{\mathcal{L}_{u_i}^t}$), max($o_u^t$), max(B_num$_u^t$)], represents the goal of the model, which represents the minimum average loss, the maximum proportion of training data and the maximum number of batches, $\sqrt{d_k}$ represents the dimension of vector $K_U^t$, $K_U^t$ has the same dimension as $Q^t$;

The global model $f(w^t)$ on the server side at time t is expressed as follows:

$$f(w^t) = \sum_{u_i \in C_t} p_{u_i}^t F_{u_i}(w_{u_i}^t) \quad (4)$$

$$F_{u_i}(w_{u_i}^t) = \frac{1}{H_i} \sum_{i=1}^{H_i} L(w_{u_i}^t; x_{i,k}) \quad (5)$$

Wherein, $w^t$ is the parameter of global model on the server send at t, $p_{u_i}^t$ is the aggregation weight of the user $u_i$ model parameters, $F_{u_i}(w_{u_i}^t)$ is the local user model, $L(w_{u_i}^t; x_{i,k})$ is the local target loss function of the i-th user $u_i$, $x_{i,k}$ represent the k-th local training data.

According to the global prediction model obtained in segment t, the content popularity is predicted, and the obtained popular content file set is put into the cache to meet the user's request at segment t, so as to improve the cache hit rate.

Beneficial Effect

The mobile edge caching framework based on federated learning designed by the present invention uses the similarity between users to perform clustering, selects users who participate in local FL training according to the proposed user selection method, and uses the attention mechanism to control the aggregation weight, reducing training time. In the case of reducing training consumption, the model convergence is accelerated and the cache hit ratio is improved.

DETAILED DESCRIPTION

In order to make the purpose, technical solution and understanding of the present invention clearer, the implementation of the present invention will be described in detail below in conjunction with the accompanying drawings.

The invention relates to an optimization method for mobile edge cache based on federated learning. In the mobile edge caching architecture, the same prediction model architecture is deployed on the MEC server and users, and federated learning is used to train the prediction model; the user performs model training according to the local request data set, and the server-side global model is obtained through aggregates the model parameters of local user's, the user provides the server with parameters related to the user model, as the basis for selecting users to participate in training and aggregate user model parameters; according to the obtained global model to predict the popular content file set and puts it in the cache to improve the user's hit rate, to meet the user needs.

The specific steps are as follows:

Step 1: Use the RWP random waypoint model to obtain the trajectory table of user time, and obtain the user set within the coverage area of the base station in each time slice.

Step 1.1: Divide the entire system into several areas, multiple users are distributed within the system. One area equipped with a base station, and a MEC server is deployed nearby. Users are served by the base station through wireless network links, and users have certain computing power.

Figure 1:
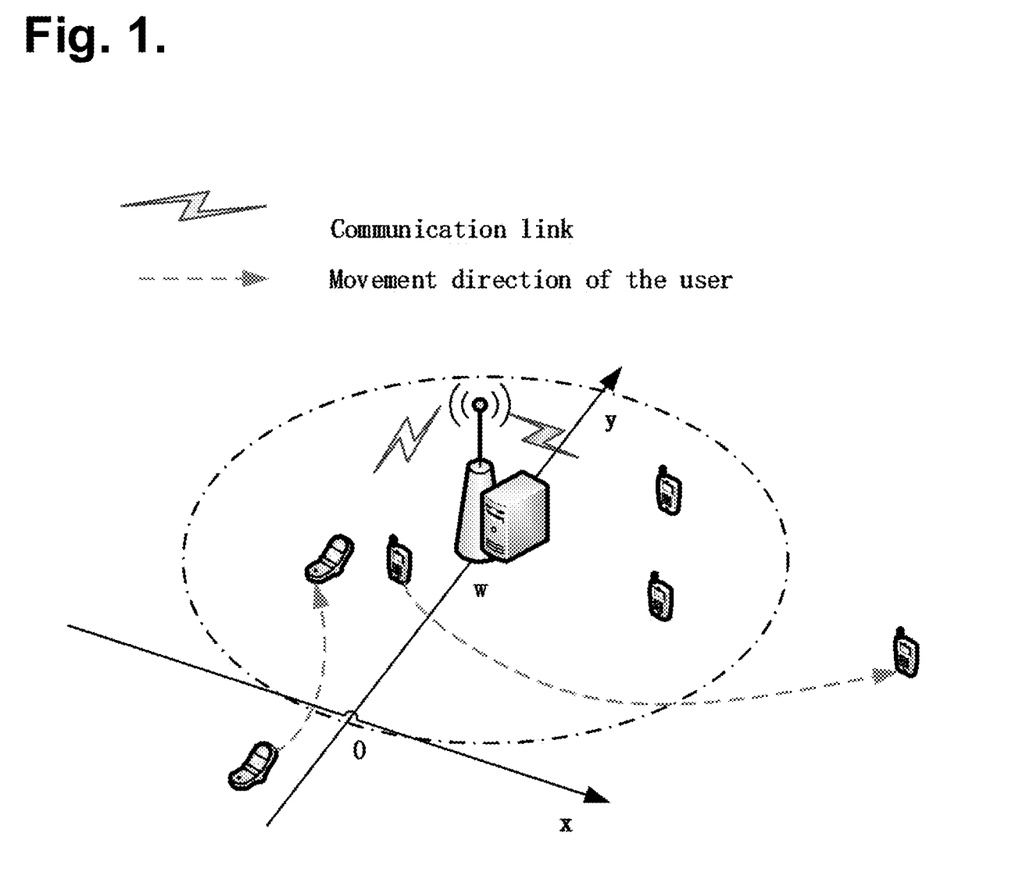
FIG. 1 is an example diagram of the system model.
Figure 2:
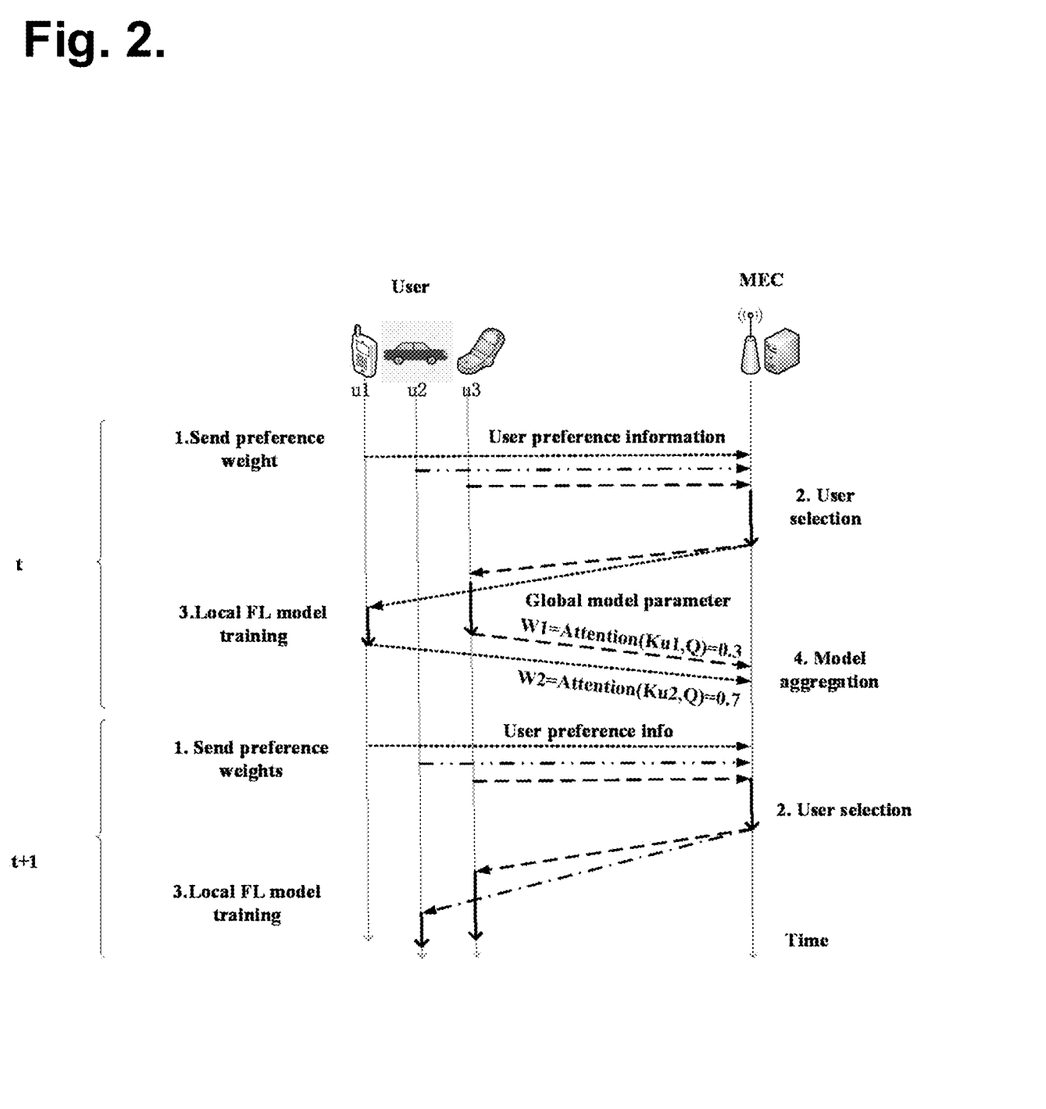
FIG. 2 is an illustration of categories based on DBSCAN clustering.

FIG. 1 is an example diagram of the system model. The system range on the coordinate axis is set to (−2v, 2v, 4v), which specifically indicates that the upper left point is a square area with a side length of 4v at (−2v, 2v). In this area, there are a total of N users, that is, $U=\{u_1, u_2, \ldots, u_N\}$, users move in the whole system; adopt the concept of time slot to divide the considered time period into T segments, expressed as $\Gamma=\{1, 2, \ldots, t, \ldots, T\}$, $D^t=\{D_1^t, D_2^t, \ldots, D_n^t\}$ represent each user's local request historical data set in segment t, and $H^t=\{H_1^t, H_2^t, \ldots, H_n^t\}$ represent the number of data sets, that is, the number of data sets Di of the i-th user $u_i$ is $H_i^t$. The base station BS is placed from v meters from the origin of the coordinate wheelbase, and the position of the base station is (0,v), the operation range of the base station is less than the system range.

Step 1.2: Use RWP model to generate all users' movement trajectories within the system, and obtain the time period trajectory table of all users, where the position of user $u_i$ at time t is recorded as $(x_{u_i}^t, y_{u_i}^t)$. Calculate the distance between each user $u_i$ and the base station at time t, the distance formula is:

$$d_{u_i}^t = \sqrt{(x_{u_i}^t)^2 + (y_{u_i}^t - v)^2} \quad (1)$$

If $d_{u_i}^t < v$, it means that the user $u_i$ is within the range of the base station at time t, otherwise, on the contrary, the user set $U^t$ within the coverage area of the base station at time t is obtained.

Step 2: An optimization method for mobile edge cache based on federated learning, using federated learning for the whole process of user selection and model aggregation:

S1: In the initial stage t=1, the user set within the scope of the base station at the current moment is $U^t$, all users in the user set participate in model training, and the i-th user $u_i$ takes the local historical request data set $D_i^t$ (the initial data set at this time) as the input of the model to obtaining the updated parameters $w_{u_i}^t$ of the model. The user uploads the model parameters to the MEC server, and the server averages the model parameters of the users participating in the training to obtain the FL global model, that is, the aggregation weight $p_i$ of the model is the mean value of all user model parameters. According to the global prediction model, the user's possible request file set is obtained, and placed in cache by the MEC server.

S2. When t>1, calculate the preferences of all users in the user set $U^t$ who move to the base station range at the current t, the preference $P_{u_i}$ of the $i^{th}$ user $u_i$ is equal to the point multiplication of model parameters $w_{u_i}^{t-1}$ of the user $u_i$ at t−1 and the user's historical request data $D_i^{t-1}$ at t−1; send the preferences to the MEC server, and calculate the cosine similarity of preferences between any user in the user set, where the specific formula for the cosine similarity of preferences between user $u_i$ and user $u_j$ is:

$$Sim_{u_j}^{u_i} = \frac{P_{u_i}^t \cdot P_{u_j}^t}{\|P_{u_i}^t\|\|P_{u_j}^t\|} \quad (2)$$

Using the cosine similarity of user preferences as input of the DBSCAN clustering algorithm to cluster users.

S4. Select users to participate in training according to the clustering results;

Set the clustering result as category a, and label is {1, 2, . . . , a−1, None}, where label None indicates a low similarity with other users due to the uncertainty of the user's movement location and request content. The number of users in each category of the cluster with 1 user is {$N_1$, $N_2$, . . . , $N_a$, Nnone}, where $N_i$ represents the number of users in one category, and the sum of the number of users with labels other than None is $N_{sel}$, that is $N_{sel}=\Sigma_{i=1}^{a-1}N_i$, the proportion of each type of user participating in the training is selected according to the thresholds $T_{max}$ and $T_{min}$, which can be expressed as follows:

$$\begin{cases} \frac{N_{none}}{N_{none}+N_{sel}} < T_{min}, N_{pro} = p, N_{sel} = 1-p \\ T_{min} < \frac{N_{none}}{N_{none}+N_{sel}} < T_{max}, N_{pro} = 0.5, N_{sel} = 0.5, \\ \frac{N_{none}}{N_{none}+N_{sel}} > T_{max}, N_{pro} = q, N_{sel} = 1-q \end{cases}$$

Wherein, $$\frac{N_{none}}{N_{none}+N_{sel}}$$

indicates the ratio of the number of users in None category to all categories of users. $N_{pro}$ represents the selection ratio of None category, that is, $N_{none}*N_{pro}$ users are randomly selected from None category to participate in training. $N_{sel}$ is the selection ratio of non-None categories. $N_i*N_{sel}$ users are selected from one category, where i={1, 2, . . . , a−1}, p and q are random values within the range of (0.2, 0.5); the set of users selected in each category is user set Ct that segment t participates in model training, where $C_t \epsilon U^t$.

Step 5: MEC server sends the FL global model parameter $w^{t-1}$ obtained at time t−1 to all users in the user set $C_t$ participating in model training at segment t as the initial parameter of the user model at segment t; user $u_i$ uses the local history data $D_i^t$ training model corresponding to segment t to obtain the updated user model parameter $w_{u_i}^t$. The average loss value is $\overline{\mathcal{L}_{u_i}^t}$, the number of batches required to complete an epoch is $B\_num_{u_i}^t$. For segment t, the ratio of user $u_i$ training model data to all user data participating in training is $$o_{u_i}^t = \frac{H_i^t}{\sum_{i \in C_t} H_i^t}.$$

Step 6: The users participating in the training upload the obtained proportion $o_{u_i}^t$, model parameters $w_{u_i}^t$, average loss $\overline{\mathcal{L}_{u_i}^t}$ and $B\_num_{u_i}^t$ to the server for aggregation. The user's aggregation weight is obtained according to the attention mechanism, that is $$p_u^t = \text{Attention}(Q^t, K_U^t) = \text{softmax}\left(\frac{Q^t K_U^t}{\sqrt{d_k}}\right),$$

where $p_u^t$ is the user aggregation weight vector, $K_U^t=$ [$\overline{\mathcal{L}_{u_i}^t}$, $o_u^t$, $B\_num_u^t$], $\overline{\mathcal{L}_{u_i}^t}$, $o_u^t$ and $B\_num_u^t$ are respectively the vectors of $\overline{\mathcal{L}_{u_i}^t}$, $o_u^t$ and $B\_num_u^t$ composed by all users in the user set $C_t$, $Q^t=[(\overline{\mathcal{L}_{u_i}^t}), \max(o_u^t), \max(B\_num_u^t)]$, represents the goal of the model, which represents the minimum average loss, the maximum proportion of training data and the maximum number of batches, $\sqrt{d_k}$ represents the dimension of vector $K_U^t$, $K_U^t$ has the same dimension as $Q^t$.

Figure 3:
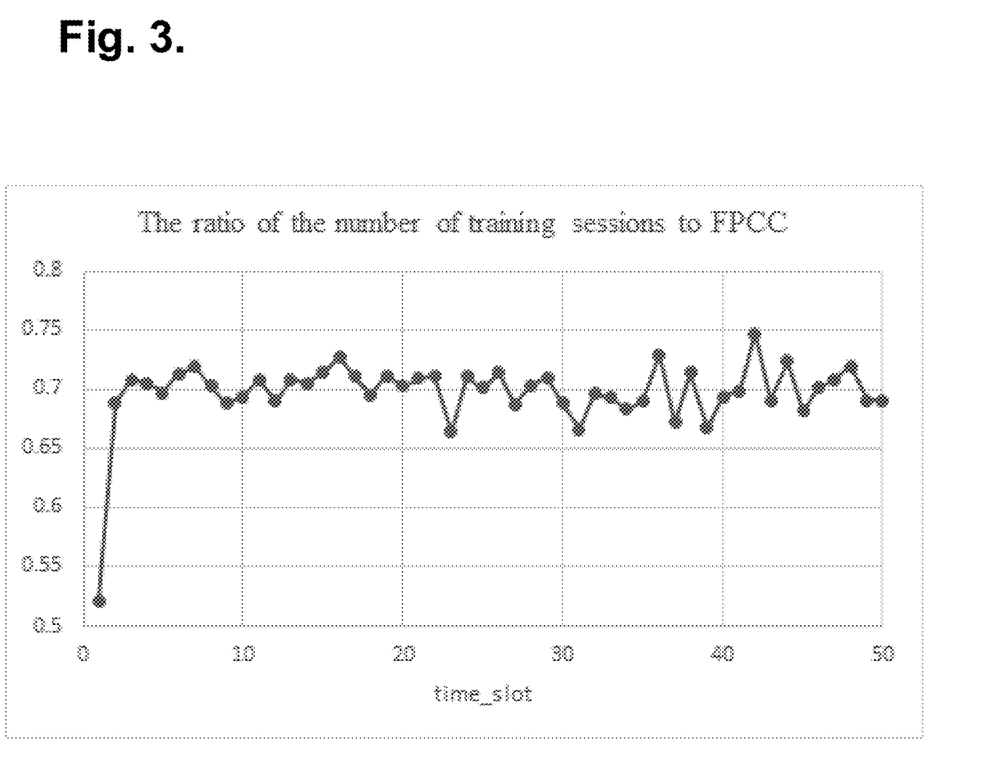
FIG. 3 is the whole process of the proposed federated learning communication framework in round t training.

FIG. 3 shows the whole process of the proposed federated learning communication framework diagram at segment t, that is, S2-S6 in step 3. First, all users within the range of the base station, such as u1,u2 and u3 in the figure, send their local preferences to the MEC platform; on the MEC side, the similarity between users is calculated and clustered, and the threshold selection strategy is proposed to select participants for training. Select the user to participate in the training, and send the current global model parameters to the selected user, as the initial parameters of the user model to participate in the training at t, such as u1 and u3 in FIG. 3, which are the user selected for segment t. The local FL model requests the data set according to the user history Perform fitting training, and send the recorded user model-related parameters and user-related information to the server; the server uses the attention mechanism to obtain the weight of each user model, and the MEC side aggregates all local parameters according to the weight to obtain the global model. Complete a global model training at a time, and store the data set obtained by the global model to the current MEC server.

S6. According to the obtained global prediction model, the server obtains the popular files requested by users within the coverage area at this time, and puts them into the cache, so as to meet the requirements of the current fragment user's request.

S7. Repeat step 2 to step 6 until segment T is reached.

Figure 4:
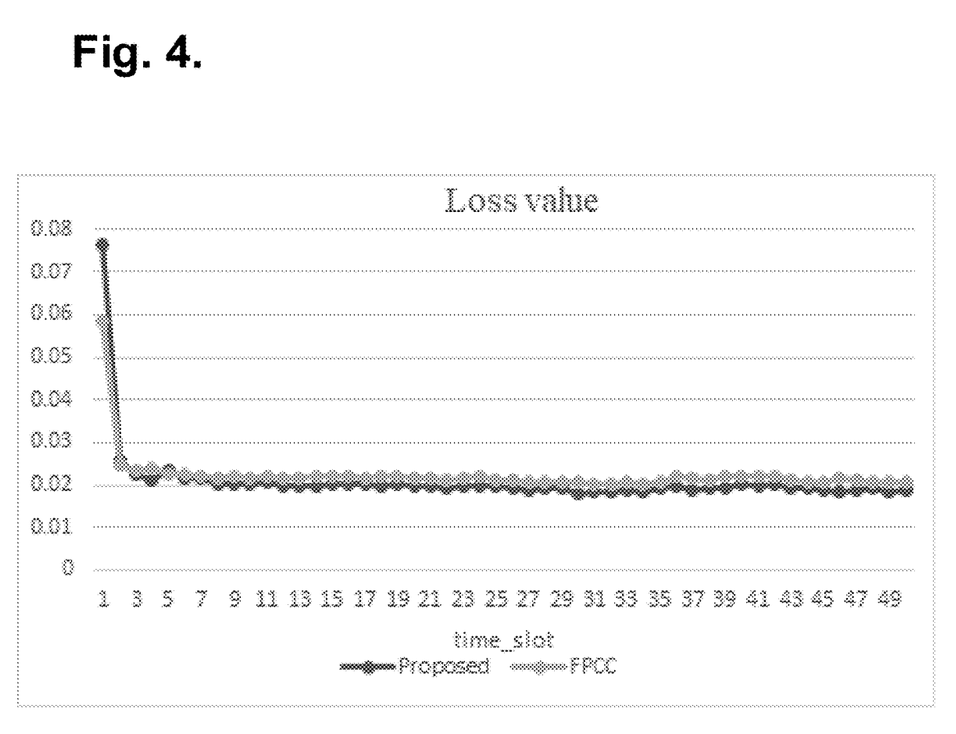
FIG. 4 is a comparison of the training loss between the proposed method and FPCC.
Figure 5:
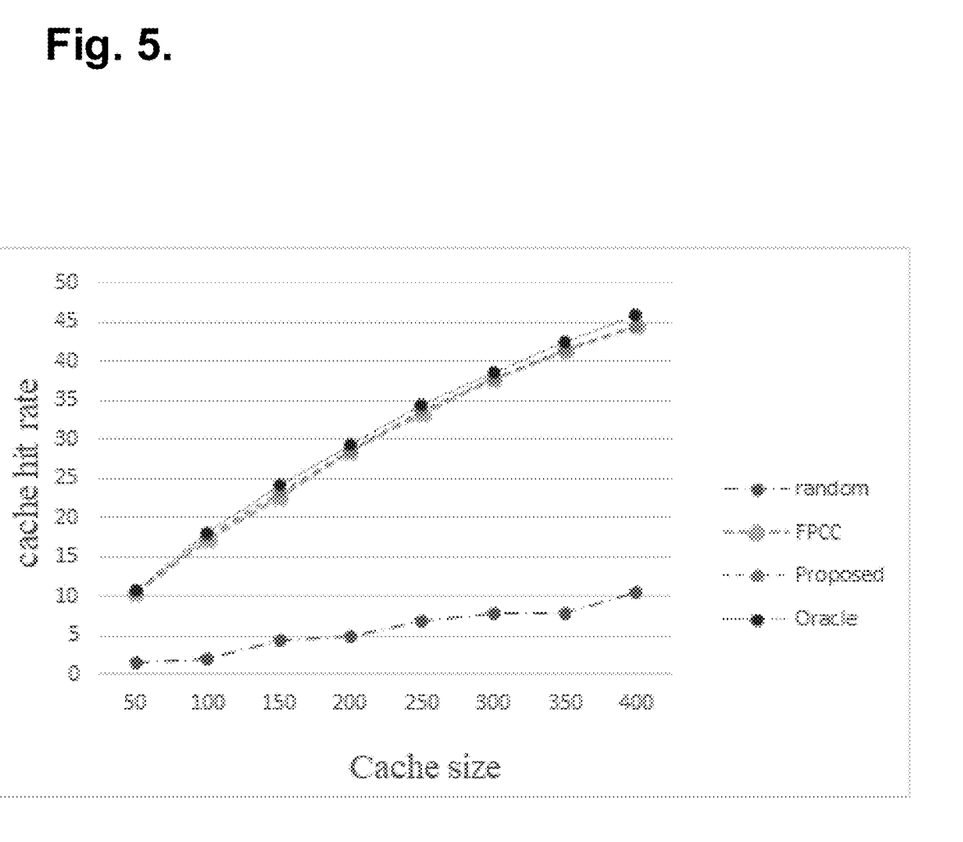
FIG. 5 is a comparison of the cache hit rate between the proposed method and other cache algorithms in different cache sizes.

It can be seen from FIG. 3, the ratio of the amount of local training data and FPCC in the algorithm proposed in different segments in the simulation, among the number of simulations, the highest number of training is 75% of FPCC. It can be seen from FIG. 4, compared with the FPCC algorithm, the proposed algorithm can achieve better model accuracy; and from FIG. 5, as the cache continues to increase, the proposed algorithm shows a better hit rate than FPCC and random. It can be seen that the present invention can achieve a higher hit rate than FPCC when the maximum amount of training data is only 75% of FPCC, and secondly, it can also achieve rapid convergence.

The invention claimed is:

1. A method for federated-learning based mobile edge cache optimization, comprising:

Step 1: use a random waypoint (RWP) model to obtain a table of trajectories of movements of a plurality of N users during a time period comprising a plurality of time slices and to obtain using the table a set $U^t$ of the users in the plurality that were within the coverage of a base station comprised at an edge of a network in each time slice, wherein a mobile edge computing (MEC) server is proximate to the base station and wherein the users within the coverage are served by the base station via wireless links;

Step 2: select those of the users the set $U^t$ who participate in federated learning (FL) local training;

Step 3: train an FL local model for each of the users selected in step 2 in a distributed manner using historical request data of that selected user, upload parameters of the each of the trained models to the MEC server, use an attention mechanism to control an aggregation weight of each of the trained models, the aggregate the parameters of the trained models in accordance with their weights to obtain a global model, predict popular content in accordance with the global model and cache the predicted popular content to the MEC server to improve the cache hit rate.

2. A method according to claim 1, wherein obtaining the user set $U^t$ within the coverage area of the base station at one of the time slices t comprises using time slots to divide the considered time period into T of the slices, expressed as $\Gamma=\{1, 2, \ldots, t, \ldots, T\}$; generating a position of the user $u_i$ in the time slice t using the RWP model; calculating the distance between the position of the user $u_i$; and the base station, wherein if the distance is less than the coverage of the base station, then the user is within the coverage of the base station at time t;

traversing all users to obtain the user set $U^t$ within the coverage of the base station at the time slice t.

3. A method to claim 1, wherein selecting the users further comprises:

step 2.1: calculate preferences of all users in the user set $U^t$ who moved to the base station at the current time t, where the preference $P_{u_i}$ of the $i^{th}$ user $u_i$ is equal to a point multiplication of model parameters $w_{u_i}^{t-1}$ of the user $u_i$ at t-1 and the user's historical request data $D_i^{t-1}$ at t-1; send the preferences to the MEC server, and calculate a cosine similarity of the preferences between any of the users in the user set, where a formula for the cosine similarity of the preferences between user $u_i$ and user $u_j$ is:

$$Sim_{u_j}^{u_i} = \frac{P_{u_i}^t \cdot P_{u_j}^t}{\|P_{u_i}^t\| \|P_{u_j}^t\|}; \quad (2)$$

and use the cosine similarity of user preferences as input of a Density Based Spatial Clustering of Applications with Noise (DBSCAN) clustering algorithm to cluster the users;

step 2.2: set the clustering result as category a, and label is {1, 2, . . . , a–1, None}, where label None indicates a low similarity with other users due to an uncertainty of the user's movement location and request content, wherein the number of users in each category of the cluster with 1 user is $\{N_1, N_2, \ldots, N_a, N_{none}\}$, where $N_i$ represents a number of the users in one category, and a sum of the number of the users with the labels other than None is $N_{sel}$, which is $N_{sel}=\Sigma_{i=1}^{a-1} N_i$; select a proportion of each type of the users participating in the training according to the thresholds $T_{max}$ and $T_{min}$, expressed as follows:

$$\begin{cases} \frac{N_{none}}{N_{none} + N_{sel}} < T_{min}, N_{pro} = p, N_{sel} = 1 - p \\ T_{min} < \frac{N_{none}}{N_{none} + N_{sel}} < T_{max}, N_{pro} = 0.5, N_{sel} = 0.5, \\ \frac{N_{none}}{N_{none} + N_{sel}} > T_{max}, N_{pro} = q, N_{sel} = 1 - q \end{cases} \quad (3)$$

wherein $$\frac{N_{none}}{N_{none} + N_{sel}}$$

indicates a ratio of the number of users in None category to all categories of the users $N_{pro}$ represents the selection ratio of None category, meaning that, $N_{none} * N_{pro}$ users are randomly selected from None category to participate in training, $N_{sel}$ is the selection ratio of non-None categories, $N_i * N_{sel}$ users are selected from one category, where $i=\{1, 2, \ldots, a-1\}$, and p and q are random values within the range of (0.2, 0.5), and wherein the set of users Ct selected in each category for that slice t participates in model training, where $C_t \in U^t$.

4. A method according to claim 1, wherein the aggregation at slice t further comprises:

step 3.1: send by the MEC server sends the an FL global model parameter $w^{t-1}$ obtained at time t-1 to all users in the user set $C_t$ participating in model training at the slice t as the initial parameter of the user model at the slice t and using by the user $u_i$ a local history data $D_i^t$ training model corresponding to the slice t to obtain an updated user model parameter $w_{u_i}^t$, wherein the average loss value is $\overline{\mathcal{L}_{u_i}^t}$, and a number of batches required to complete an epoch is $B\_num_{u_i}^t$, and wherein for the slice t, the ratio of user $u_i$ training model data to all user data participating in training is $$o_{u_i}^t = \frac{H_i^t}{\sum_{i \in C_t} H_i^t};$$

step 3.2: upload by the users participating in the training the obtained proportion $o_{u_i}^t$, and model parameters $w_{u_i}^t$, average loss $\overline{L_{u_i}^t}$ and $B\_num_{u_i}^t$ to the MEC server for the aggregation; obtaining the user's aggregation weight according to the attention mechanism, which is $$p_u^t = \text{Attention}(Q^t, K_U^t) = \text{softmax}\left(\frac{Q^t K_U^t}{\sqrt{d_k}}\right),$$

where $p_u^t$ is the user aggregation weight vector and $K_U^t=[\overline{L_u^t}, o_u^t, B\_num_u^t]$, $\overline{L_u^t}$, are respectively vectors of $\overline{L_u^t}$, $o_u^t$ and $B\_num_u^t$ composed by all the users in the user set $C_t$, $Q^t=[\min(\overline{L_u^t}), \max(o_u^t), \max(B\_num_u^t)]$, represents a goal of the model, which represents a minimum average loss, a maximum proportion of training data and a maximum number of batches, $\sqrt{d_k}$ represents the dimension of vector $K_U^t$. $K_U^t$ has the same dimension as $Q^t$, and wherein the global model $f(w^t)$ on the server side at time t is expressed as follows:

$$f(w^t) = \sum_{u_i \in C_t} p_{u_i}^t F_{u_i}(w_{u_i}^t) \qquad (4)$$

$$F_{u_i}(w_{u_i}^t) = \frac{1}{H_i} \sum_{i=1}^{H_i} L(w_{u_i}^t; x_{i,k}) \qquad (5)$$

where $w^t$ is the parameter of global model on the server send at t, $p_{u_i}^t$ is the aggregation weight of the user $u_i$ model parameter $F_{u_i}(w_{u_i}^t)$ is the local user model, $L(w_{u_i}^t; x_{i,k})$ is a local target loss function of the i-th user $u_i$, and $x_{i,k}$ represent the k-th local training data.

\* \* \* \* \*